United States Patent
Schumacher et al.

(10) Patent No.: US 8,100,411 B2
(45) Date of Patent: Jan. 24, 2012

(54) CYLINDER HEAD GASKET

(75) Inventors: Thomas Schumacher, Riederich (DE); Harry Hinderer, Bad Urach (DE); Armin Diez, Lenningen (DE); Klaus Bendl, Oberderdingen (DE)

(73) Assignee: ElringKlinger AG, Dettingen (DE)

( * ) Notice: Subject to any disclaimer, the term of this patent is extended or adjusted under 35 U.S.C. 154(b) by 34 days.

(21) Appl. No.: 11/891,979

(22) Filed: Aug. 14, 2007

(65) Prior Publication Data
US 2008/0048401 A1 Feb. 28, 2008

(30) Foreign Application Priority Data

Aug. 26, 2006 (DE) .......................... 10 2006 040 121
Nov. 25, 2006 (DE) .......................... 10 2006 055 741

(51) Int. Cl.
*F16J 15/08* (2006.01)
(52) U.S. Cl. ...................... 277/601; 277/593
(58) Field of Classification Search .................. 277/593, 277/600, 601
See application file for complete search history.

(56) References Cited

U.S. PATENT DOCUMENTS

| | | | | |
|---|---|---|---|---|
| 4,721,315 A | * | 1/1988 | Ueta | 277/593 |
| 5,332,237 A | * | 7/1994 | Hagiwara et al. | 277/592 |
| 5,385,354 A | * | 1/1995 | Hagiwara et al. | 277/594 |
| 5,393,076 A | * | 2/1995 | Hagiwara et al. | 277/592 |
| 5,472,217 A | * | 12/1995 | Hagiwara et al. | 277/596 |
| 5,582,415 A | * | 12/1996 | Yoshida et al. | 277/592 |
| 5,618,049 A | * | 4/1997 | Ueta | 277/595 |
| 5,695,200 A | | 12/1997 | Diez et al. | 277/593 |
| 5,755,447 A | | 5/1998 | Hagiwara et al. | 277/601 |
| 5,875,548 A | | 3/1999 | Diez et al. | 29/888.3 |
| 5,938,208 A | * | 8/1999 | Yoshida et al. | 277/592 |
| 6,148,516 A | | 11/2000 | Diez et al. | 29/888.3 |
| 6,189,895 B1 | * | 2/2001 | Yamada | 277/591 |
| 6,322,084 B1 | * | 11/2001 | Yamada et al. | 277/591 |
| 6,585,272 B2 | * | 7/2003 | Inamura et al. | 277/592 |
| 6,688,606 B2 | * | 2/2004 | Hohe et al. | 277/600 |
| 6,715,770 B2 | * | 4/2004 | Schmitt | 277/591 |
| 7,374,176 B1 | * | 5/2008 | Wade | 277/592 |
| 2001/0045708 A1 | | 11/2001 | Hohe et al. | 277/592 |
| 2008/0042371 A1 | * | 2/2008 | Flemming | 277/593 |

FOREIGN PATENT DOCUMENTS

| | | |
|---|---|---|
| DE | 37 41 344 A1 | 6/1989 |
| DE | 41 42 600 A1 | 7/1993 |
| DE | 195 20 695 C1 | 7/1996 |
| DE | 298 12 037 U1 | 11/1998 |
| DE | 10 2005 012 172 A1 | 5/2006 |
| EP | 0 468 526 B1 | 7/1991 |

OTHER PUBLICATIONS

ElringKlinger Prospectus, ElringKlinger AG, 2 pages, 2001.

* cited by examiner

*Primary Examiner* — Gilbert Lee

(57) ABSTRACT

Cylinder head gasket whose gasket plate comprises a single sheet metal layer, combustion chamber openings, and for each combustion chamber opening a ring-shaped combustion chamber sealing element, which is a sheet metal ring that is arranged on the sheet metal layer and is joined to the latter by welding; to avoid the risk of damage to a combustion chamber sealing element as a result of sliding movements occurring between a cylinder head sealing surface and the cylinder head gasket while the engine is in operation, all sheet metal rings are arranged on that side of the sheet metal layer which is to face an engine block.

5 Claims, 1 Drawing Sheet

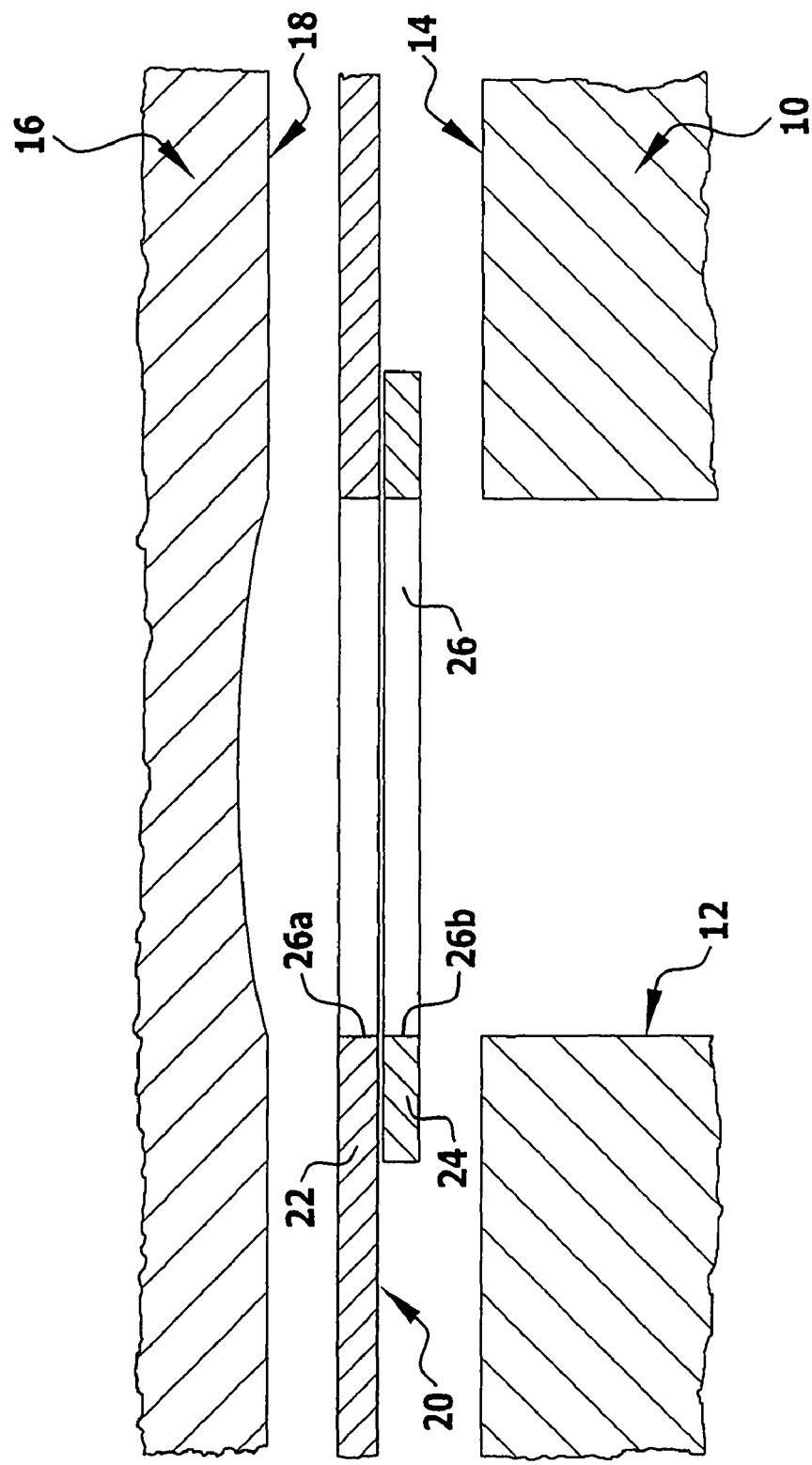

CYLINDER HEAD GASKET

The present disclosure relates to the subject matter disclosed in German application number 10 2006 055 741.7 of Nov. 25, 2006, which is incorporated herein by reference in its entirety and for all purposes.

BACKGROUND OF THE INVENTION

The invention relates to a cylinder head gasket for a multicylinder engine, in particular, for a diesel engine for a commercial vehicle. The cylinder head gasket comprises a single-layered gasket plate with a single sheet metal layer, combustion chamber openings, and for each combustion chamber opening at least one ring-shaped combustion chamber sealing element, which encloses the associated combustion chamber opening and is in the form of a sheet metal ring which is arranged on the sheet metal layer and is joined with a substance-to-substance bond, in particular by welding, to the sheet metal layer. The sheet metal layer can, however, also be provided with coatings and/or inserts.

When, in such a cylinder head gasket, a bead which is elastic in the direction of its height is provided in the sheet metal layer outside of the sheet metal ring for sealing around a combustion chamber opening, the aforementioned sheet metal ring also has the function of a so-called stopper for preventing excessive flattening of the sealing bead when installing the cylinder head gasket and while the engine is in operation. However, the present invention relates, in particular, to cylinder head gaskets in which sealing around a combustion chamber opening is effected with only one sheet metal ring, so that the latter forms the single combustion chamber sealing element. In this case, the sheet metal layer is then flat at least in the vicinity of the combustion chamber openings, but it can also be flat overall.

In known cylinder head gaskets of the kind mentioned at the outset, the sheet metal rings in the form of flat rings are arranged on that side of the sheet metal layer (usually and hereinbelow referred to as carrier sheet) which faces the cylinder head when the gasket is installed. The sheet metal rings are joined to the carrier sheet, which is flat under the sheet metal rings, by welding, namely by spot welding or by means of continuous weld seams. Within the scope of the present invention, it is, however, also conceivable to use different kinds of substance-to-substance bond such as, for example, adhesive bonding by means of a high-temperature-resistant adhesive.

Owing to the tendency to construct reciprocating internal combustion engines with increasingly high compression, the following problem is gaining more and more importance: as a result of the varying gas pressures occurring during operation of the engine, the cylinder head and its sealing surface facing the engine block are periodically arched upwards, i.e., away from the engine block, in the rhythm of the ignitions, which results in rhythmic sliding movements between the cylinder head sealing surface and the cylinder head gasket—such relative movements as occur in the plane of the so-called sealing gap between the sealing surfaces of cylinder head and engine block are referred to as sliding movements. It has been found that in the known cylinder head gaskets described hereinabove, these increased sliding movements can result in destruction of welded joints, but, above all, of the sheet metal rings themselves. In the latter case, a portion of a sheet metal ring facing the carrier sheet remains adhered to the carrier sheet, while, at least in the area of segments of the sheet metal ring, upper portions of the sheet metal ring are split off, which, as a consequence, can also lead to radial breakages in the sheet metal ring. At any rate, the sealing around the combustion chamber opening concerned is then no longer ensured.

The following is also to be noted in conjunction with the risk of destruction discussed hereinabove: on the one hand, the material of the weld points or weld seams serving to attach the sheet metal rings often projects above the sheet metal rings, albeit only slightly, and, on the other hand, the material that is melted on and then solidifies during the welding forms hard "weld cores", which, when the cylinder head gasket is assembled and pressed, are subjected to high pressing forces and are thereby pressed in the direction towards the interior of the carrier sheet. Primary damage to the cylinder head gasket at the interfaces between the weld cores and the sheet metal rings can already occur at this stage, and this primary damage further increases the risk of destruction of the welded joints and/or the sheet metal rings when, after installation of the cylinder head gasket, the sheet metal rings are pressed against the cylinder head and are subjected to the sliding movements between the cylinder head sealing surface and the cylinder head gasket while the engine is in operation.

SUMMARY OF THE INVENTION

The subject matter of the invention is a cylinder head gasket for a multicylinder engine, in particular, for a high-compression diesel engine for a commercial vehicle, the cylinder head gasket comprising a single-layered gasket plate with a single sheet metal layer, combustion chamber openings, and for each combustion chamber opening at least one ring-shaped combustion chamber sealing element, which encloses the associated combustion chamber opening and is in the form of a sheet metal ring which is arranged on the sheet metal layer and is joined with a substance-to-substance bond, in particular by welding, to the sheet metal layer, and the invention is based on the object of eliminating or at least minimizing the risk of destruction discussed hereinabove.

The inventors started from the consideration that the sliding movements described hereinabove occur at least substantially only between the cylinder head gasket and the sealing surface of the cylinder head, even though considerably smaller sliding movements can also occur between the cylinder head gasket and the sealing surface of the engine block.

It is, therefore, proposed, in accordance with the invention, that in a cylinder head gasket of the kind mentioned at the outset all sheet metal rings be mounted on that side of the sheet metal layer (the carrier sheet) which faces the engine block when the cylinder head gasket is installed.

As is evident from the foregoing explanations, in preferred embodiments of the cylinder head gasket according to the invention the sheet metal layer (the carrier sheet) is, at least in the vicinity of the combustion chamber openings, but preferably overall, flat. However, this does not exclude the existence of applications for the present invention, in which a sealing bead which is elastic in the direction of its height is also provided in the sheet metal layer, radially outside of the sheet metal ring, for sealing around a combustion chamber opening, so that the sheet metal ring associated with this combustion chamber opening then forms not only a combustion chamber sealing element but also a stopper for the sealing bead; such embodiments are, however, not preferred.

There is known from the prospectus "Cylinder Head Gaskets. Quality starts in the head." by ElringKlinger A G, a substantially metallic cylinder head gasket (see page 27 loc. cit.), whose gasket plate comprises a single sheet metal layer extending over the entire gasket plate, which will be referred to hereinbelow as carrier sheet. The carrier sheet has combustion chamber openings and fluid openings for the passage of fluid media such as cooling water and lubricating oil. Injection molded onto the edges of the fluid openings on the carrier sheet are ring-shaped elastomeric sealing elements. Around each combustion chamber opening, this known cylinder head gasket is provided with a combustion chamber sealing element in the form of a sheet metal ring arranged on the carrier sheet. Immediately adjacent to the combustion chamber opening, the carrier sheet and the sheet metal ring each have a flat, ring-shaped edge area which is followed by full beads of the carrier sheet and the sheet metal ring, which engage one another radially outwardly, with the convex side of the sheet metal ring bead that faces the carrier sheet engaging the concave side of the carrier sheet bead. The prospectus does not disclose how and where the sheet metal ring is joined to the carrier sheet. Carrier sheet and sheet metal ring could, however, be joined to one another in the area of the two full beads by welding, the welding could be carried out on the still flat metal sheets and only then could the two metal sheets that lie on one another be jointly provided with the two full beads by stamping, namely using a stamping tool having a recess of such configuration that the weld seam is at least not subjected to any appreciable stress when stamping the beads. From the illustration of this known cylinder head gasket in the cited prospectus, the sheet metal ring appears to lie on that side of the carrier sheet which faces the engine block when the cylinder head gasket is installed. However, this known cylinder head gasket belongs to a species of gasket which is different from the type of gasket improved by the present invention, for in this known cylinder head gasket the sealing around the combustion chamber opening is mainly effected by the full beads of the carrier sheet and the sheet metal ring, whereas the cylinder head gasket according to the invention is beadless in the area of the sheet metal ring, and the sealing around the combustion chamber opening in the immediate vicinity of the combustion chamber opening is effected by the ring area of the gasket plate, which is thickened by the sheet metal ring, being clamped by the cylinder head screws with particularly high pressing forces between the engine block and the cylinder head when installing the cylinder head gasket. In addition, in the known cylinder head gasket, owing to the full beads engaging one another, the sheet metal ring cannot assume a stopper function for a bead that might be provided in the carrier sheet and is located at a distance from the sheet metal ring behind the latter (viewed from the combustion chamber opening).

The pressing forces serving to clamp a cylinder head gasket between the sealing surfaces of engine block and cylinder head are applied at points by the cylinder head screws. For this reason, and because the engine components engine block and cylinder head cannot be regarded as absolutely rigid components, but exhibit a locally varying component rigidity, in the absence of special measures the pressing forces acting on the installed cylinder head gasket are not the same overall. In order to make the pressing forces acting on the cylinder head gasket around the combustion chamber openings uniform, in preferred embodiments of the cylinder head gasket according to the invention the combustion chamber sealing elements, i.e., the sheet metal rings, have height profiles, i.e., a varying thickness, around the combustion chamber openings, these height profiles being configured so as to take into account the decrease in the screwing forces with an increase in the distance from the cylinder head screws and the locally varying component rigidities. If the sheet metal rings have a height profile, the latter is provided on the side of the sheet metal rings that faces away from the sheet metal layer, i.e., the carrier sheet.

BRIEF DESCRIPTION OF THE DRAWINGS

An embodiment of the cylinder head gasket according to the invention, shown only schematically, will be explained hereinbelow with reference to the appended drawing. The drawing shows a section through an area of the cylinder head gasket comprising a combustion chamber opening and through the areas of the engine block and the cylinder head that are adjacent to the cylinder head gasket when the cylinder head gasket is installed. With a view to improving the clarity of the representation, the various components were drawn in spaced relation to one another, and the dimensions of the carrier sheet and the sheet metal ring were not drawn to scale.

DETAILED DESCRIPTION OF THE INVENTION

The drawing shows an engine block 10 with a combustion chamber 12 and an engine block sealing surface 14, a cylinder head 16 with a cylinder head sealing surface 18, and a cylinder head gasket 20 (all only partially). The illustrated embodiment of the cylinder head gasket has a flat carrier sheet 22 and—as far as illustrated—a sheet metal ring 24. Above the combustion chamber 12, the cylinder head gasket 20 has a combustion chamber opening, designated in its entirety by 26, which is formed by an opening 26a in the carrier sheet 22 and the opening 26b of the sheet metal ring 24.

The cylinder head gasket according to the invention does not have to be purely metallic and can be provided with one or more, in particular elastomeric, coatings and/or inserts which are not illustrated in the drawing.

In accordance with the invention, the sheet metal ring 24 is substantially thinner than the carrier sheet 22 and is attached to that side of the carrier sheet 22 which faces the engine block 10 when the cylinder head gasket is installed. As mentioned hereinabove, the sheet metal ring 24 can be joined to the carrier sheet 22 by spot welding or by means of a continuous weld seam.

In addition, the underside of the sheet metal ring 24, in accordance with the drawing, can be provided with the height profile explained hereinabove, which can be produced by, for example, stamping. Instead of providing the sheet metal ring 24 itself with a height profile, it is also possible to provide the area of the carrier sheet 22 that is adjacent to the sheet metal ring 24 with a height profile before attaching the sheet metal ring 24 to the carrier sheet 22. In that case, this height profile should be provided on the side of the carrier sheet 22 that faces away from the sheet metal ring 24.

As will be apparent from the foregoing explanations, embodiments are preferred, in which the interfaces between the sheet metal layer and the sheet metal rings are overall flat and have neither a height profile nor a bead contour.

In preferred embodiments of the invention, the sheet metal ring 24 borders directly on the combustion chamber opening 26 although it could, in principle, have an opening 26b whose diameter is somewhat larger than the diameter of the combustion chamber 12. In addition, it is conceivable for the cylinder head gasket to comprise a plurality of combustion chamber sealing elements for sealing around a combustion chamber opening although, for reasons of expense alone, this is not desirable.

In preferred embodiments, the sheet metal rings are very thin—their thickness lies between 0.05 mm and 0.40 mm, preferably in the order of magnitude of 0.25 mm. The carrier sheet, on the other hand, is substantially thicker and has a thickness of up to 1.10 mm, preferably of approximately 0.40 mm.

The invention claimed is:

1. Cylinder head gasket for a multicylinder engine, said cylinder head gasket comprising a single-layered gasket plate with a single sheet metal layer extending at least substantially over the entire gasket plate, combustion chamber openings, and for sealing around each one of said combustion chamber openings only one metallic sealing device having at least one ring-shaped combustion chamber sealing element, which encloses the associated combustion chamber opening and is in the form of a sheet metal ring which is arranged on a ring-shaped portion of the sheet metal layer covered by said sheet metal ring, said ring being welded to said sheet metal layer, said sheet metal ring and said portion of the sheet metal layer both being substantially flat on their sides facing one another with said sides being directly welded to one another, wherein said sealing device is formed only by said sheet metal ring and said ring-shaped portion of the sheet metal layer, wherein the gasket is beadless in the immediate vicinity of said sealing device, wherein the material thickness of the ring is substantially smaller than the material thickness of the sheet metal layer, wherein around the combustion chamber opening said ring-shaped portion of the sheet metal layer has a side having a height profile with a varying thickness to reduce non-uniformity of the pressing forces acting on the mounted cylinder head gasket around the combustion chamber opening, and wherein all sheet metal rings are mounted only on an engine block-facing side of said sheet metal layer which faces the engine block when said cylinder head gasket is installed.

2. Cylinder head gasket in accordance with claim 1, wherein said sheet metal layer is overall flat.

3. Cylinder head gasket in accordance with claim 1, wherein the material thickness of the ring is between 0.05 mm to 0.40 mm.

4. Cylinder head gasket in accordance with claim 3, wherein the material thickness of the ring is approximately 0.25 mm.

5. Cylinder head gasket in accordance with claim 1, wherein the sheet metal layer has a material thickness of up to 1.10 mm.

* * * * *